Dec. 12, 1950 J. R. GOMERSALL 2,533,578
WATER LEVEL INDICATOR
Filed Dec. 4, 1946
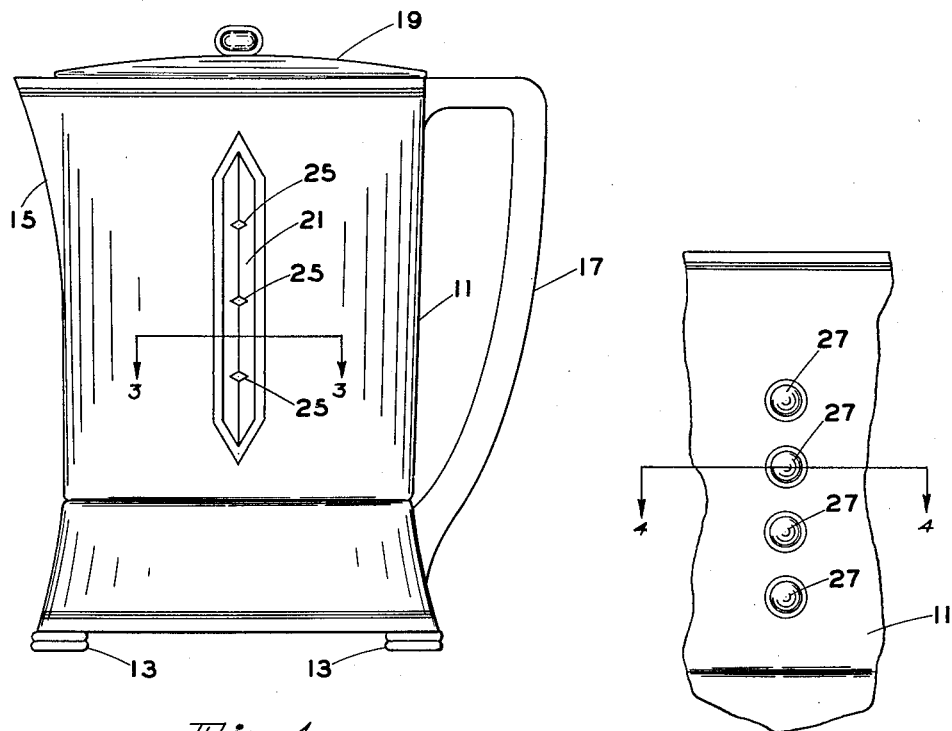
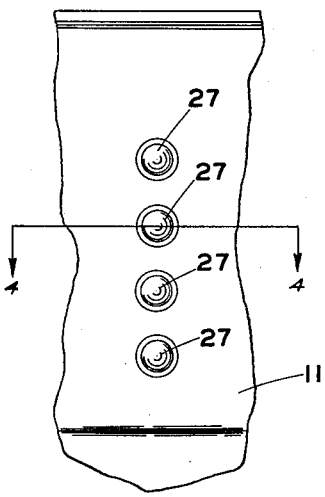
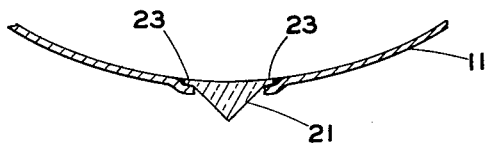
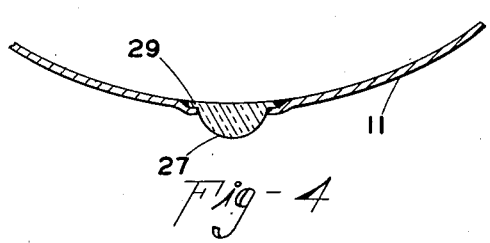
INVENTOR.
JOHN R. GOMERSALL
BY
*H. M. Biebel*
ATTY Patented Dec. 12, 1950

2,533,578

UNITED STATES PATENT OFFICE 2,533,578

WATER LEVEL INDICATOR

John R. Gomersall, Elgin, Ill., assignor to McGraw Electric Company, Elgin, Ill., a corporation of Delaware Application December 4, 1946, Serial No. 714,045

1 Claim. (Cl. 73—334)

My invention relates to coffee makers and tea pots and particularly to means in non-transparent coffee makers for indicating the water level.

An object of my invention is to provide a relatively simple form of water level indicator particularly applicable to coffee makers.

Another object of my invention is to provide a relatively simple form of water level indicator comprising a transparent Pyrex glass member having its edges soldered to an edge of an opening in a coffee pot.

Other objects of my invention will either be apparent from a description of several forms of a device embodying my invention or will be pointed out in the course of such description and set forth in the appended claims.

In the drawings,

Figure 1 is a view in side elevation of a non-transparent coffee pot embodying my invention, Fig. 2 is a fragmentary view showing a modified form of my invention, Fig. 3 is a fragmentary view taken on the line 3—3 of Fig. 1, Fig. 4 is a fragmentary view taken on the line 4—4 of Fig. 2, and, Fig. 5 is a fragmentary view of another modification.

Referring first of all to Fig. 1 of the drawings, I have there shown a metallic coffee pot 11 provided with supports 13 secured to its bottom and embodying a pouring spout 15, a handle 17, as well as a cover 19. A water or coffee level indicator 21 includes a Pyrex glass prism having relatively thin side edges 23, the outer surface of these outer edges or flanges 23 being provided with a metallic layer .001" to .002" thick, according to a method of metallizing glass brought out by the Corning Glass Company. This thin metalized flange 23 is soldered into an embossed aperture in the wall of container 11, the flange 23 lying inside of, and against, the ledge formed by the outwardly offset metal at the edge of the aperture. The inner face of the prism 21 is flush with the inner surface of the container, and the solder fills the space around the flange 23, that is between the outermost edge of the flange and the flanking part of the aperture, so that the solder too is flush with the inner surface of the container wall 11.

The vertical length of the Pyrex glass indicator 21 may be made any desired value and may extend from the lower end of the pot to the upper end and may be provided with indicating insignia 25 or with numbers or figures indicating the number of cups of water or coffee, the lowermost one indicating say two cups, the intermediate one four cups and the uppermost one indicating six cups.

Referring now to Figs. 2 and 4, I have there shown a modified form of device embodying my invention and comprising a plurality of substantially circular lenses 27 having an outer relatively thin flange 29, the outer surface of which has been metallized and soldered into the embossed aperture in the container as hereinbefore stated. The lowermost lens 27 may indicate two cups, the next one above four cups and the next two, six and eight cups respectively.

In the case of the use of a plurality of lenses 27, different colors may be used and instead of an elongated prism member 21, might be of any geometric design to give the appearance of a jewel or cameo and lenses 27 may be of different colors.

Referring now to Fig. 5 I there show a part of a coffee maker 31, made of frosted or non-transparent glass having a strip 33 thereof, which has had the non-transparent part thereof removed as by polishing, so that the strip is transparent.

Various modifications may be made without departing from the spirit and scope of my invention, and I desire that all such modifications coming within the appended claim shall be considered a part of my invention.

I claim as my invention:

In the combination of a liquid container having a window-aperture in the wall thereof and a window-piece of light-transmitting material in said aperture, the improvement wherein said window-piece has a thin edge and said aperture of said container has a ledge extending entirely around said aperture, outward from the inner surface of the wall, for abutting said thin edge and thereby supporting said window-piece against outward displacement in a position in which its inner face is substantially flush with the inner surface of the container, and wherein a body of sealing material fills the space between the edge of said window-piece and the edge of said aperture, the inner surface of said sealing material lying substantially flush with the inner surface of said window-piece and container wall.

JOHN R. GOMERSALL.

REFERENCES CITED

The following references are of record in the file of this patent:

UNITED STATES PATENTS

| Number | Name | Date |
|---|---|---|
| 303,422 | De Llong | Aug. 12, 1884 |
| 1,183,872 | Groff | May 23, 1916 |
| 1,203,448 | Ainsworth | Oct. 31, 1916 |
| 1,399,313 | Newell | Dec. 6, 1921 |
| 1,419,509 | Newell | June 13, 1922 |
| 2,050,576 | Kronquest | Aug. 11, 1936 |
| 2,075,477 | Smith | Mar. 30, 1937 |
| 2,096,848 | Felix | Oct. 26, 1937 |

FOREIGN PATENTS

| Number | Country | Date |
|---|---|---|
| 1,798 | Great Britain | of 1859 |
| 12,057 | Great Britain | of 1902 |
| 34,619 | Canada | July 1890 |